United States Patent [19]

Mihara

[11] Patent Number: 5,705,895

[45] Date of Patent: Jan. 6, 1998

[54] POWER CIRCUIT WITH DUTY CONVERSION CIRCUIT FOR DRIVING A CAPACITIVE LOAD

[75] Inventor: Masaaki Mihara, Chiba, Japan

[73] Assignee: SGS-Thomson Microelectronics K.K., Tokyo, Japan

[21] Appl. No.: 572,664

[22] Filed: Dec. 14, 1995

[30] Foreign Application Priority Data

Dec. 14, 1994 [JP] Japan .................................. 6-310565

[51] Int. Cl.$^6$ .................................................. H05B 37/02
[52] U.S. Cl. ..................... 315/307; 315/224; 315/DIG. 5
[58] Field of Search ................................... 315/307, 224, 315/291, 169.3, 244, DIG. 5

[56] References Cited

U.S. PATENT DOCUMENTS

| | | | |
|---|---|---|---|
| 3,780,344 | 12/1973 | Paget | 315/241 P |
| 4,527,096 | 7/1985 | Kindlmann | 315/169.3 |
| 4,633,141 | 12/1986 | Weber | 315/307 |
| 5,233,273 | 8/1993 | Waki et al. | 315/224 |

*Primary Examiner*—Robert Pascal
*Assistant Examiner*—David Vu
*Attorney, Agent, or Firm*—David V. Carlson; Seed and Berry LLP

[57] ABSTRACT

A power terminal is connected to a DC power source. A differential amplifier has primary and secondary input terminals and an output terminal, and a device applies a reference voltage to the secondary input terminal of the differential amplifier. A phase inverter has an input terminal connected to the output terminal of the differential amplifier and has primary and secondary output terminals that output two output signals of opposite phase. A push-pull drive circuit has primary and secondary input terminals connected to the primary and secondary output terminals of the phase inverter, and has primary and secondary output terminals connected to a switching element that alternately turns on and off by being driven by the two output signals of opposite phase that are provided from the output terminals of the phase inverter. An autotransformer has a tap connected to the power terminal and taps, provided at both sides of the tap connected to the power terminal, that are connected to the primary and secondary output terminals at the push-pull drive circuit, respectively. A capacitive load may be connected at both sides of the autotransformer. A positive feedback path connects one terminal of the autotransformer to the primary input terminal of the differential amplifier, and a sinusoidal AC voltage is applied to the capacitive load. A duty ratio conversion circuit automatically changes the duty ratio of drive signals for the push-pull drive circuit according to the resonance frequency that is determined by the inductance of the autotransformer and the capacitance of the capacitive load. The duty ratio conversion circuit is connected between the phase inverter and the push-pull drive circuit.

21 Claims, 4 Drawing Sheets

POWER CIRCUIT WITH DUTY CONVERSION CIRCUIT FOR DRIVING A CAPACITIVE LOAD

CROSS-REFERENCE TO RELATED APPLICATION

This application is related to an application entitled "Power Circuit for Driving a Capacitive Load" by the same inventor, bearing U.S. patent application Ser. No. 08/592,118 and filed Dec. 14, 1995, which is hereby incorporated by reference.

TECHNICAL FIELD

The present invention relates to a power circuit, and more particularly, to a power circuit with a duty conversion circuit for driving a capacitive load.

BACKGROUND OF THE INVENTION

An electroluminescent panel is used as a flat panel display in many products. One common use is in a wrist watch. The power for driving the electroluminescent panel in a wrist watch is provided by a battery. A DC voltage must be converted into an AC voltage, which is then applied to the electroluminescent panel. However, it is necessary to maintain the frequency of this AC voltage at several hundred Hz and the peak-to-peak value of this AC voltage at several hundred volts because of the characteristics of the electroluminescent panel.

Existing power circuits that use the charging and discharging of a capacitor, in a circuit with an inductor, have been proposed as a power circuit to generate an AC voltage of several hundred volts from a DC voltage of tens of volts for use as described above. They are described in U.S. Pat. Nos. 4,208,869; 4,449,075; and 4,527,096.

Some existing power circuits for electroluminescence that use the charging and discharging of a capacitor, and power circuits for electroluminescence that use an inductor, generate rectangular waveforms. Therefore, they have the problem of a low luminous efficiency at the electroluminescent panel as well as the generation of a large mount of noise.

A power circuit for electroluminescence using a transformer has been developed in order to reduce the above problem. The electroluminescent panel, which is a capacitive load, makes up a resonance circuit in the power circuit using a transformer, and an AC voltage in a sinusoidal waveform is applied to the electroluminescent panel. Therefore, it has the advantages of reduced noise generation and high luminous efficiency.

However, the size of the transformer having a primary coil and a secondary coil is quite large, and the capacitance of the entire power circuit accordingly becomes large. Therefore, containing the power circuit within the housing of a wrist watch is difficult. Furthermore, the cost of the transformer is high, so increased cost of the entire power circuit presents another problem. Moreover, in order to emit a relatively large electroluminescence, it is necessary to increase the capacity of the transformer, and the transformer consequently becomes larger and heavier. Accordingly, power circuits for electroluminescence that use transformers are only used today in large size display panels and they cannot be used in small size applications, such as a wrist watch.

Furthermore, the development of a power circuit for electroluminescence that is equipped with a luminance compensation device is desirable because the luminous intensity of the electroluminescence decreases as the life of the electroluminescence deteriorates.

SUMMARY OF THE INVENTION

An object of this invention is to provide a lightweight and low cost power circuit for driving capacitive loads. Another object of the invention is to provide a power supply which allows electroluminescence to be emitted at high efficiency without generating noise, and in which the appropriate energy for the load can be automatically supplied according to the changing conditions in the load.

The power circuit of this invention attains these and other objects. In the invention, a power input terminal is connected to a DC power source. A differential amplifier has primary and secondary input terminals and an output terminal. A reference voltage is applied to the secondary input terminal of the differential amplifier. A phase inverter has an input terminal connected to the output terminal of the differential amplifier and has primary and secondary output terminals that output two output signals of opposite phase. A push-pull drive circuit has primary and secondary input terminals, and has primary and secondary output terminals connected to a switching element that alternately turns on and off by being driven by the two output signals of opposite phase that are provided from the output terminals of the phase inverter. An autotransformer has a tap connected to the power terminal and taps, provided at both sides of the tap connected to the power terminal, that are connected to the primary and secondary output terminals at the push-pull drive circuit, respectively. A capacitive load may be connected at both sides of the autotransformer. A positive feedback path connects one terminal of the autotransformer to the primary input terminal of the differential amplifier, and a sinusoidal AC voltage is applied to the capacitive load. A duty ratio conversion circuit automatically changes the duty ratio of drive signals for the push-pull drive circuit according to the resonance frequency that is determined by the inductance of the autotransformer and the capacitance of the capacitive load. The duty ratio conversion circuit is connected between the phase inverter and the push-pull drive circuit.

An autotransformer, also called a single-coil transformer, is used in the power circuit of this invention. It is much easier to manufacture an autotransformer than a common transformer with a secondary coil. The cost can be substantially reduced, and the capacity can also be reduced. Accordingly, a reduction in size and weight, as well as a low cost, can be attained when compared to existing power circuits using transformers with secondary coils.

Furthermore, the resonance circuit consists of an autotransformer and a capacitive load. Therefore, the waveform of the output voltage that drives the load takes the form of a sine wave. The use of a sine wave generates less noise and can particularly improve the luminous efficiency when an electroluminescent panel is used as the load. The resonance frequency of this resonance circuit is also inversely proportional to the sum of the inductance of the autotransformer and the capacitance of the load. The capacitance of the panel decreases through changes with the passage of time when an electroluminescent panel, for example, is used as the load. However, the luminous intensity does not change much but remains almost constant because the resonance frequency in that case increases. In other words, this invention provides the further advantage that the luminous intensity is maintained almost constant for a long period of time.

Furthermore, a duty ratio conversion circuit, which automatically changes the duty ratio of the drive signals for the push-pull drive circuit according to the resonance frequency that is determined by the inductance of the autotransformer and the capacitive load, is connected between the phase inverter and the push-pull drive circuit in this invention. Therefore, the appropriate energy for the load can be supplied according to the conditions of the load even though the capacitance of the load fluctuates. As the electroluminescence panel deteriorates with the passage of time, the capacitance of the electroluminescence panel used as the load decreases and the resonance frequency determined by the capacitance of the load and the inductance of the autotransformer increases. However, the duty ratio for the drive signals likewise increases because the pulse width of the drive pulses for the push-pull drive circuit is always maintained constant. As a result, the loss of luminance due to the deterioration of the electroluminescence panel with the passage of time can be automatically compensated. Through the structure above, an appropriate energy can be automatically supplied according to the conditions of the load without detecting the changing conditions in the load.

The features of the present invention shall be made more evident by the following detailed description of a preferred and alternative embodiments of the invention.

DETAILED DESCRIPTION OF THE INVENTION

Figure 1:
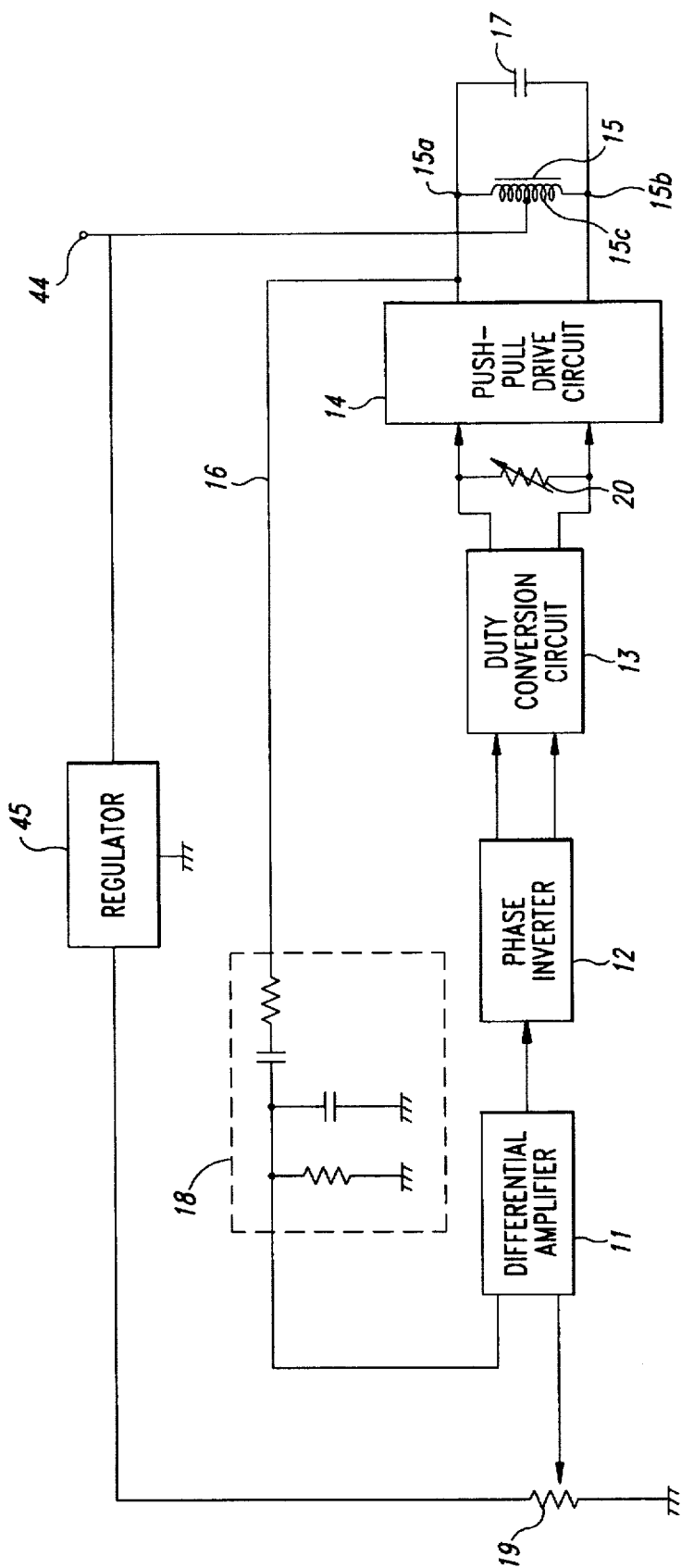
FIG. 1 is a block diagram of a power circuit of a preferred embodiment of the present invention.

FIG. 1 is a block diagram which indicates the structure of the power circuit in this invention in an application example; an electroluminescent panel is driven as a capacitive load in this example. A power circuit in this invention is equipped with a differential amplifier 11, a phase inverter 12, a duty conversion circuit 13, a push-pull drive circuit 14, an autotransformer 15, and a positive feedback path 16. An output terminal of the differential amplifier 11 is connected to an input terminal of the phase inverter 12, and signals of the opposite phase, that is, 180° out of phase from each other, are generated. These output signals are supplied to the duty conversion circuit 13. The duty conversion circuit 13 generates output signals having a duty ratio that corresponds to the capacitive change of the load and supplies these output signals to the push-pull drive circuit 14.

The primary output terminal and the secondary output terminal of the push-pull drive circuit 14 are connected to both ends 15a and 15b at the autotransformer 15, respectively. A tap 15c of the autotransformer 15 is connected to a positive terminal of the power source $V_{cc}$ that is connected to the positive electrode of a DC power source. An electroluminescent panel 17, which is shown as a capacitive load, is connected between both ends 15a and 15b of the autotransformer 15. The terminal 15a at one end of the autotransformer 15 is connected to an input terminal at one end of the differential amplifier 11 by way of the positive feedback path 16. A filter 18 is connected within this positive feedback path 16. This filter is for adjusting the Q at the resonance circuit that consists of the autotransformer 15 and the electroluminescent panel 17 as the load. Therefore, the filter is not necessary and may be eliminated. A feedback path without a filter may be used if desired. The input terminal on the other side of the differential amplifier 11 is connected to a tap at a potentiometer 19 that is connected in series to the DC power source $V_{cc}$ in order to apply the needed reference voltage.

The autotransformer 15 and the electroluminescent panel 17 make up a parallel resonance circuit in the power circuit in this invention described above. Therefore, the waveform of the AC voltage that is applied to the electroluminescent panel 17 takes the form of a sine wave, and the generation of noise is accordingly reduced and the luminous efficiency of the electroluminescent panel is also increased. Furthermore, the resonance frequency f of the parallel resonance circuit can be indicated as $f=\frac{1}{2}\pi(L \cdot C)^{1/2}$ where the inductance of the autotransformer 15 is L and the capacity of the electroluminescent panel 17 is C. The capacity C of the electroluminescent panel 17 in this example decreases over a period of time, and therefore, the luminous intensity accordingly decreases through changes over time when the peak-to-peak value of the AC voltage is constant. However, the frequency f of the AC voltage increases in this invention as the electroluminescent panel 17 deteriorates and the capacity C decreases, as can be observed in the equation above. Therefore, the luminous intensity of the electroluminescent panel can be maintained almost constant over time.

Furthermore, as indicated in FIG. 1, a variable resistor 20 is connected between the primary and secondary output terminals the duty ratio conversion circuit 13 so as to adjust the balance of the drive voltage of opposite phase that is supplied to the push-pull drive circuit 14. Accordingly, the waveform can be modified to become a sinusoidal waveform by adjusting this variable resistance 20 when the waveform of the AC voltage that is applied to the electroluminescent panel 17 deviates from the sinusoidal waveform. Resistor 20 can be provided and adjusted according to conventional methods. For example, resistor 20 can be an integrated thin film resistor that can be adjusted using known trimming methods, such as laser trimming. Alternatively, resistor 20 can be a stand-alone, variable resistor, as necessary. A determination of a need to adjust resistor 20 can be made during a testing phase of the manufacturing process, and resistor 20 can be adjusted accordingly. Alternatively, an end customer could determine a need to adjust resistor 20 and could adjust it accordingly.

Figure 2:
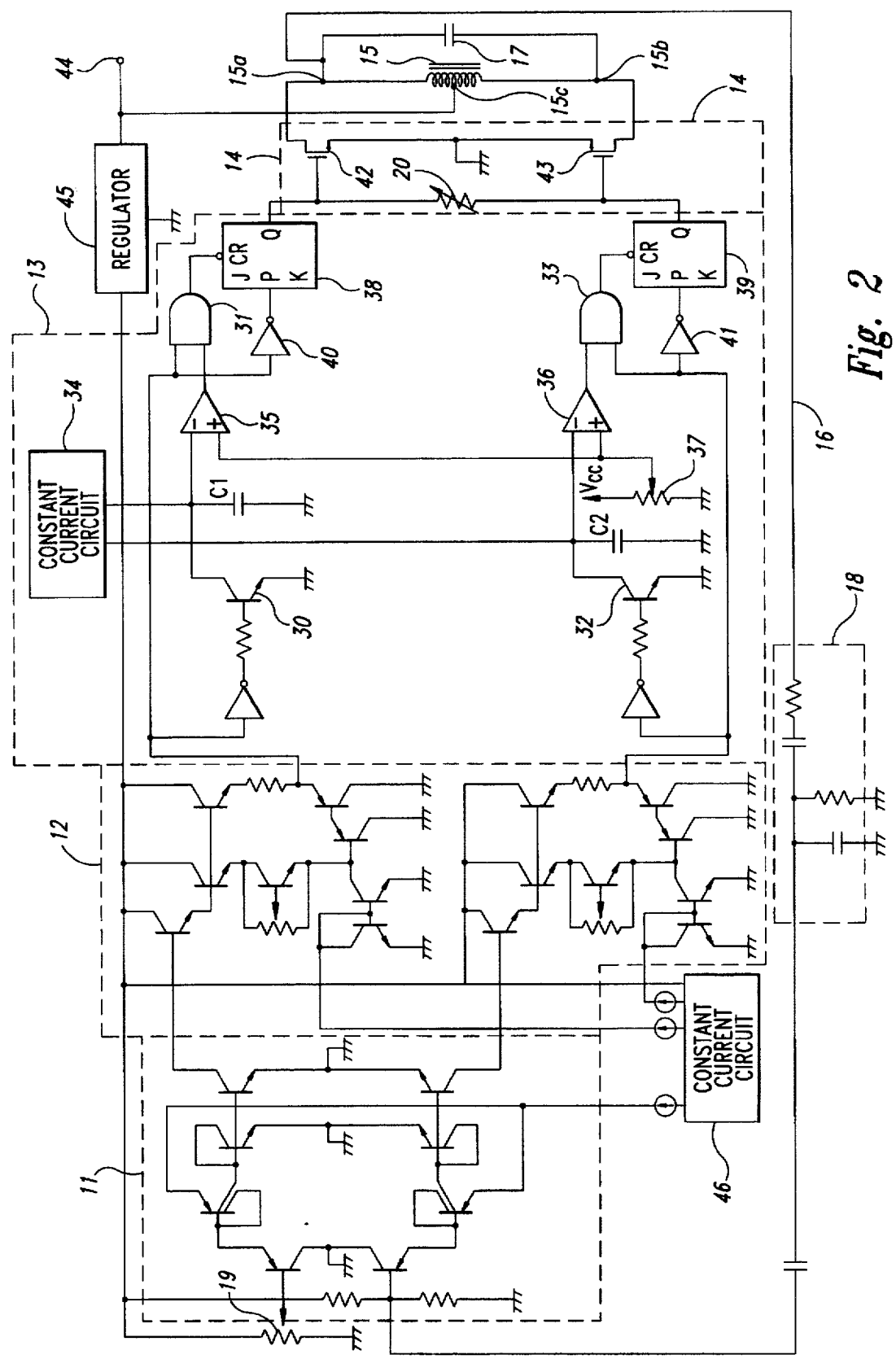
FIG. 2 is a detailed circuit diagram of a preferred embodiment of a power circuit of the present invention.

FIG. 2 is a circuit diagram showing a detailed structure of the power circuit of the present invention shown in the block diagram of FIG. 1. The areas in FIG. 2 that are the same as the areas indicated in FIG. 1 are indicated and have the same numbers attached. The differential amplifier 11 and the phase inverter 12 each have a known structure, and their explanation will be omitted. Constant current circuit 46 is provided for differential amplifier 11 and phase inverter 12. Rectangular wave signals that are of opposite phase are output from the primary and secondary output terminals of the phase inverter 12, and these signals are supplied to each of the primary and secondary input terminals at the duty conversion circuit 13. The primary input terminal of the duty conversion circuit 13 is connected to the base of primary transistor 30 by way of the inverter and a branch path of the resistance, and is also connected to the input terminal at one side of a primary AND gate 31. The secondary input terminal is similarly connected to the base of a secondary transistor 32 by way of the inverter and the branch path of the resistor, and is also connected to the input terminal at one side of a secondary AND gate 33. The emitter of the primary transistor 30 is grounded, its collector is connected to a junction point between the constant current circuit 34 and the primary capacitor C1, and this junction point is connected to the inverted input terminal of the primary differential amplifier. The emitter of the secondary transistor 32 is similarly grounded, its collector is connected to the junction point between the constant current circuit 34 and the secondary capacitor C2, and this junction point is connected to an inversion input terminal of the secondary differential amplifier 36. The primary and secondary differential amplifiers 35 and 36 together function as a comparator, and their non-inverting input terminals are both connected to a potentiometer 37 and are biased to a specified reference potential $V_{ref}$.

As a result, the voltage between both ends of the primary and secondary capacitors C1 and C2 takes the form of chopped wave signals that increase linearly according to each input signal. The voltage between both ends of these primary and secondary capacitors C1 and C2 is compared to the reference potential $V_{ref}$ of each of the primary and secondary amplifiers 35 and 36. Both the primary and secondary differential amplifiers 35 and 36 output signals only when the voltage between both ends of the capacitors C1 and C2 is lower than the reference potential $V_{ref}$, and supply these output signals to the primary and secondary AND gates 31 and 33, respectively. The output signals from the primary and secondary AND gates are then supplied to each of the primary and secondary JK flip-flop circuits 38 and 39. The signals that are supplied to the primary and secondary input terminals are further supplied to P terminals at the JK flip-flop circuits 38 and 39 by way of inverters 40 and 41, respectively. The output signals from these JK flip-flop circuits 38 and 39 become the output signals in which the duty is controlled in accordance with the capacitive changes at the electroluminescence panel 17, which will be described later, and are supplied to primary and secondary input terminals at the push-pull drive circuit 14, respectively.

The primary input terminal of the push-pull drive 14 is connected to a gate at a primary FET 42, and the secondary input terminal is connected to a gate at a secondary FET 43. Accordingly, it operates so that the primary FET 42 is conductive and the secondary FET 43 is simultaneously blocked, for example. The terminal 15a at one side of the autotransformer 15 is connected to a drain at the primary FET 42, the terminal 15b at the other side is connected to a drain at the secondary FET 43, and the tap 15c of the autotransformer is connected to a power terminal 44, that is connected to the positive terminal of the DC power source $V_{cc}$. The voltage of the DC power source in this example is 35V.

A three terminal regulator 45 is connected to the DC power source in order to obtain a drive voltage of 5 V for the differential amplifier 11, the phase inverter 12, and the duty conversion circuit 14. The potentiometer 19 is also connected to the output terminal at 5 V at this 3 terminal regulator 45 and its tap is connected to a negative input terminal of the differential amplifier 11 in order to obtain a reference voltage that is applied to the negative input terminal of the differential amplifier 11. Accordingly, an optimum reference voltage can be obtained by adjusting the position of the tap at this potentiometer 19.

In this manner, a sinusoidal AC voltage with a peak-to-peak value of 200 V and a frequency of 250 Hz from a DC power source at 35 V can be applied to the electroluminescent panel in this application example.

Figure 3A:
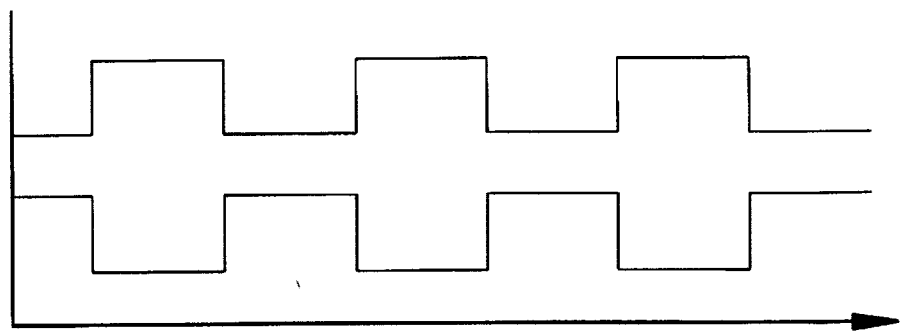
FIG. 3 is a waveform diagram that explains the control of duty cycle in a duty conversion circuit.
Figure 3B:
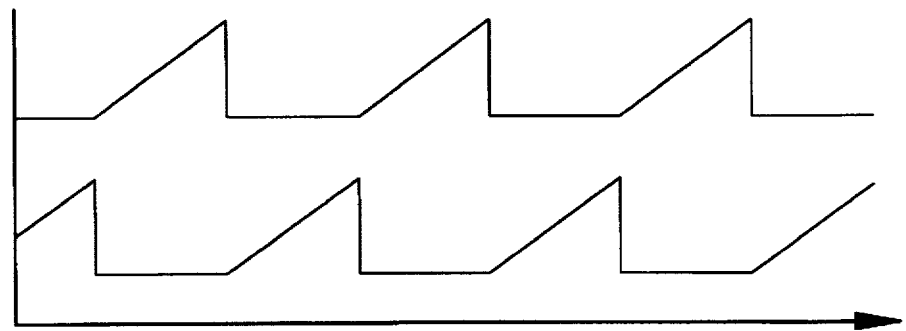
Figure 3C:
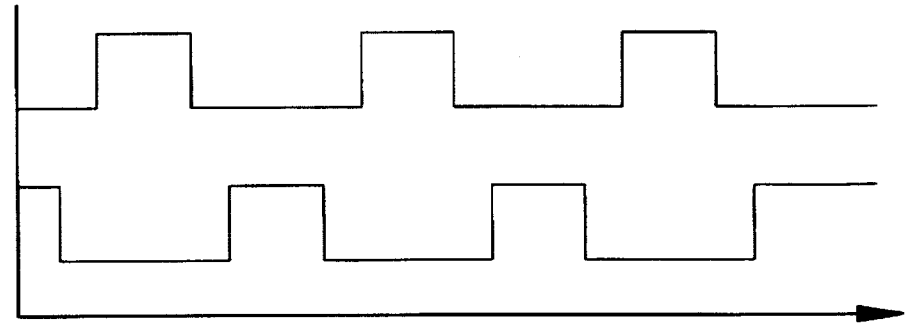
Figure 3D:
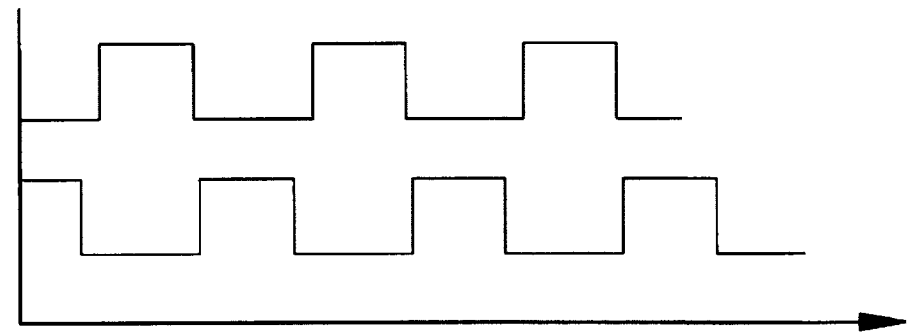

The operation of the duty conversion circuit will now be explained. FIG. 3 indicates signal waveforms at each section at the duty conversion circuit. FIG. 3a indicates an input signal waveform at the primary and secondary input terminals; FIG. 3b indicates a voltage waveform between both ends of the primary and secondary capacitors C1 and C2; FIG. 3c indicates an output signal waveform at the primary and secondary JK flip-flop circuit; and FIG. 3d indicates an output signal waveform at the JK flip-flop circuit when the capacitance of the electroluminescence panel 17 decreases and the resonance frequency is increased. As indicated in FIG. 3a, signals with a duty ratio of 50% of opposite phase are input at the primary and secondary input terminals of the duty converter. The voltage between both ends at the capacitors C1 and C2 takes the form of chopped waves indicated in FIG. 3b because a constant current is supplied from the constant current circuit 34. The voltage between both ends of these capacitors C1 and C2 is compared to the reference potential $V_{ref}$ at the differential amplifiers 35 and 36, respectively. Therefore, output signals with a pulse width having a duty ratio of less than 50%, such as 40% for example, are output from the differential amplifier by properly selecting the reference potential. On the other hand, the resonance frequency that is determined by the inductance of the autotransformer and the capacitance of the electroluminescence panel returns by way of the positive feedback path 16. Therefore, the frequency of the signals that are supplied to the duty conversion circuit 13 also increases as the resonance frequency increases. On the other hand, the pulse width of the output signals from the differential amplifiers 35 and 36 is determined by the reference potential $V_{ref}$ of the potentiometer 37. Therefore, a constant pulse width is maintained even though the resonance frequency changes. As a result, the duty ratio for the drive signals for the push-pull drive circuit 14 equally increases, and the luminance of the electroluminescence panel is automatically compensated.

Figure 4:
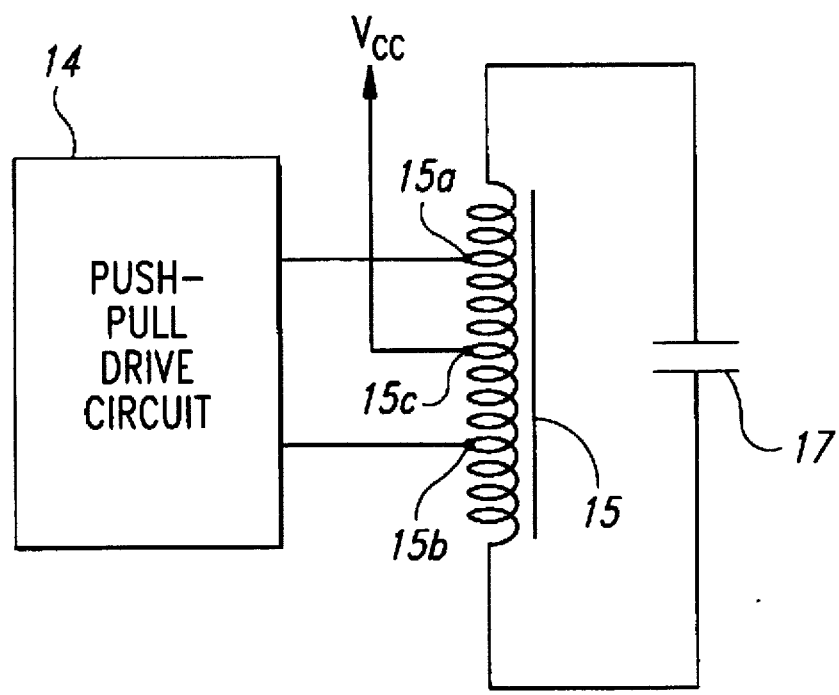
FIG. 4 is a circuit diagram of an autotransformer of a power circuit of the present invention.

FIG. 4 indicates the structure of an autotransformer in the power circuit of the present invention in another application example. The primary and secondary output terminals of the push-pull drive circuit 14 are connected between both ends 15a and 15b of the autotransformer 15 in the application example described above. However, there is the possibility that the peak-to-peak value of the output voltage that is applied to the load may drop below the needed value when the voltage $V_{cc}$ of the DC power source is low. As shown in FIG. 4, the primary and secondary output terminals of the push-pull drive circuit 14 are not connected to both ends of the autotransformer 15 but they are instead connected between the tap 15c and both ends 15a and 15b in this example. The positions of the taps to which the primary and secondary output terminals of the push-pull drive circuit 14 are connected may be halfway between the tap 15c and both ends 15a and 15b. However, they can be shifted to either side according to the voltage of the DC power source $V_{cc}$ and the value of the output voltage. Through this structure, an output voltage in the sinusoidal wave having the needed peak-to-peak value can be obtained when the voltage of the DC power source $V_{cc}$ is low—at 25V, for example.

This invention is not limited only to the application example described above, and many alterations and modifications are possible. For example, an electroluminescent panel is the capacitive load in the application example described above, but other capacitive loads may also be used. A filter is provided in the positive feedback path in order to increase the Q of the resonance in the application example above; however, this filter may be eliminated and a non-filtered feedback provided if desired. The tap of the autotransformer is positioned at the center of the coil some embodiments; however, in alternatives, it is not positioned at the center but is instead positioned closer to one end. Further, signals with a linear voltage increase over time are formed by a constant current source and the capacitor in the application example described above. However, it is acceptable if a signal waveform is obtained that has a positive slope over time, and it can be constructed with the reference voltage source $V_{cc}$ and a series circuit of the resistor and capacitor, for example.

While various embodiments have been described in this application for illustrative purposes, the claims are not so limited. Rather, any equivalent device operating according to principles of the invention falls within the scope thereof.

I claim:

1. A power circuit comprising:
   a differential amplifier having first and second inputs and an output, the first input being connected to receive a first voltage;
   a phase inverter having an input connected to receive the output of said differential amplifier and having first and second outputs with first and second phases;
   a push-pull drive circuit having first and second inputs and first and second outputs;
   a feedback path coupling the first output of said push-pull drive circuit to the second input of said differential amplifier;
   an autotransformer having first and second ends coupled between the first and second outputs of said push-pull drive circuit, said autotransformer having a tap connected to a source of a second voltage that is higher than the first voltage;
   a capacitive load attached to the first and second ends of said autotransformer, a resonance frequency being determined by inductance of said autotransformer and capacitance of said load; and
   a duty ratio conversion circuit having first and second inputs connected to the first and second outputs of said phase inverter and having first and second outputs connected to the first and second inputs of said push-pull drive circuit, said duty ratio conversion circuit changing a duty ratio of signals input to said push-pull drive circuit in response to a change in the resonance frequency.

2. The power circuit of claim 1 further including a filter positioned in said feedback path.

3. The power circuit of claim 1, further comprising:
   a voltage balancing circuit connected across the first and second outputs of said duty ratio conversion circuit, said voltage balancing circuit being capable of adjusting a balance of the sinusoidal waveform applied to the load.

4. The power circuit of claim 3 wherein said voltage balancing circuit comprises a variable resistor.

5. The power circuit of claim 1 wherein said capacitive load comprises an electroluminescent panel.

6. The power circuit of claim 1 wherein the tap is positioned halfway between the first and second ends of said autotransformer.

7. The power circuit of claim 1, further comprising:
   a voltage regulator capable of maintaining the first voltage at a predetermined voltage level, said voltage regulator being connected between the second input of said differential amplifier and the source of the second voltage.

8. The power circuit of claim 7 wherein said voltage regulator comprises a potentiometer having an end connected to the source of the second voltage and another end connected to a reference voltage, said potentiometer having a tap connected to the second input of said differential amplifier.

9. The power circuit of claim 1 wherein said autotransformer has a first tap connected to the source of the second voltage, a second tap connected to the first output of said push-pull drive circuit, and a third tap connected to the second output of said push-pull drive circuit, the second and third taps being on different sides of the first tap.

10. The power circuit of claim 9 wherein the second and third taps are positioned halfway between the first tap and the first and second ends of said autotransformer, respectively.

11. The power circuit of claim 1 wherein said push-pull drive circuit comprises a switching element that switches the first and second outputs of said push-pull drive circuit, said switching element being responsive to the first and second outputs of said duty ratio conversion circuit.

12. The power circuit of claim 11 wherein said switching element comprises:
   a first switch that switches the first output of said push-pull drive circuit responsive to the first output of said duty ratio conversion circuit; and
   a second switch that switches the second output of said push-pull drive circuit responsive to the second output of said duty ratio conversion circuit, said second switch being nonconductive when said first switch is conductive and said second switch being conductive when said first switch is nonconductive.

13. The power circuit of claim 12 wherein:
   said first switch comprises a first transistor; and
   said second switch comprises a second transistor.

14. The power circuit of claim 1 wherein said duty ratio conversion circuit comprises:
   a chopped wave generator, said chopped wave generator having first and second inputs connected to the first and second outputs of said phase inverter, said chopped wave generator having first and second outputs; and
   a comparator having first and second inputs connected to the first and second outputs of said chopped wave generator, said comparator outputting a first output when the first output of said chopped wave generator is less than a third voltage level and outputting a second output when the second output of said chopped wave generator is less than the third voltage level.

15. The power circuit of claim 14 wherein said chopped wave generator comprises:
   a constant current generator;
   a first capacitor electrically connected to said constant current generator and electrically connectable to the first output of said phase inverter; and
   a second capacitor electrically connected to said constant current generator and electrically connectable to the second output of said phase inverter.

16. The power circuit of claim 14 wherein said comparator comprises:
   a first differential amplifier having a first input connected to the first output of said chopped wave generator and a second input connected to receive the third voltage, said first differential amplifier having an output that is the first output of said comparator; and
   a second differential amplifier having a first input connected to the second output of said chopped wave generator and a second input connected to receive the third voltage, said second differential amplifier having an output that is the second output of said comparator.

17. The power circuit according to claim 1 wherein said feedback path is a positive feedback path.

18. A power circuit comprising:

a power terminal connected to a DC power source;

a differential amplifier that has primary and secondary input terminals and an output terminal;

a device that applies a reference voltage to the secondary input terminal of said differential amplifier;

a phase inverter that has an input terminal connected to the output terminal of said differential amplifier and primary and secondary output terminals that output two output signals of opposite phase;

a push-pull drive circuit that has primary and secondary input terminals, said push-pull circuit having primary and secondary output terminals that are connected to a switching element that alternately turns on and off by being driven by the two output signals of opposite phase and provided from the output terminals of the phase inverter;

an autotransformer with a tap that is connected to said power terminal and taps at both sides of the tap connected to said power terminal, the taps at both sides of the tap connected to said power terminal being connected to the primary and secondary output terminals at said push-pull drive circuit, respectively, in order for a capacitive load to be connected at both sides and such that a sinusoidal AC voltage is applied to the load, a resonance frequency being determined by inductance of said autotransformer and capacitance of the load;

a positive feedback path that connects one terminal of said autotransformer to the primary input terminal of said differential amplifier; and a duty ratio conversion circuit that has primary and secondary input terminals connected to the primary and secondary output terminals of said phase inverter, said duty ratio conversion circuit having primary and secondary output terminals that are connected to the primary and secondary input terminals of said push-pull drive circuit, said duty ratio conversion circuit changing a duty ratio of signals input to said push-pull drive circuit in response to a change in the resonance frequency.

19. The power circuit of claim 18 wherein said positive feedback path comprises a filter.

20. The power circuit of claim 18, further comprising:

a variable resistance between the primary and secondary input terminals of said push-pull drive circuit, said variable resistance being capable of adjusting the waveform of the sinusoidal AC voltage applied to the load.

21. The power circuit of claim 18 wherein an electroluminescent panel is connected as the load.

* * * * *